Patented Dec. 16, 1941

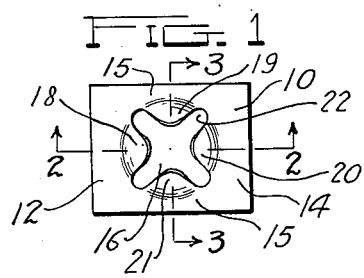
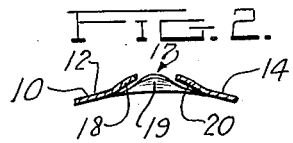
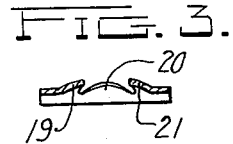
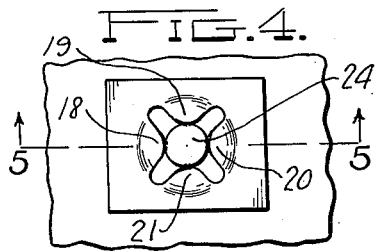
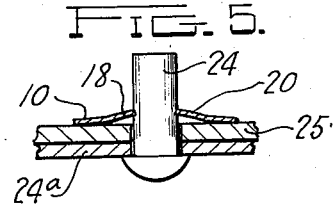
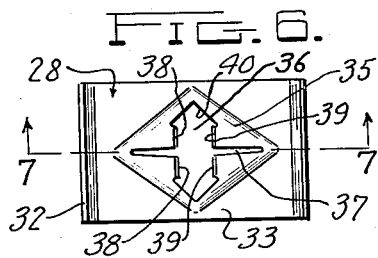
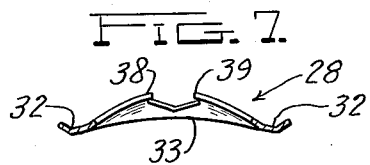
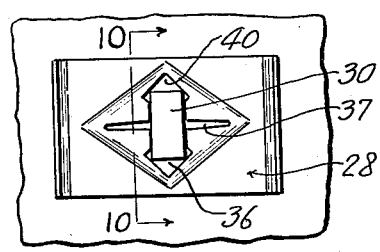
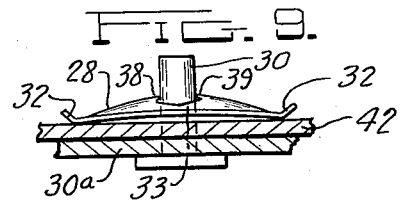
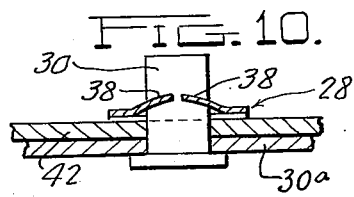

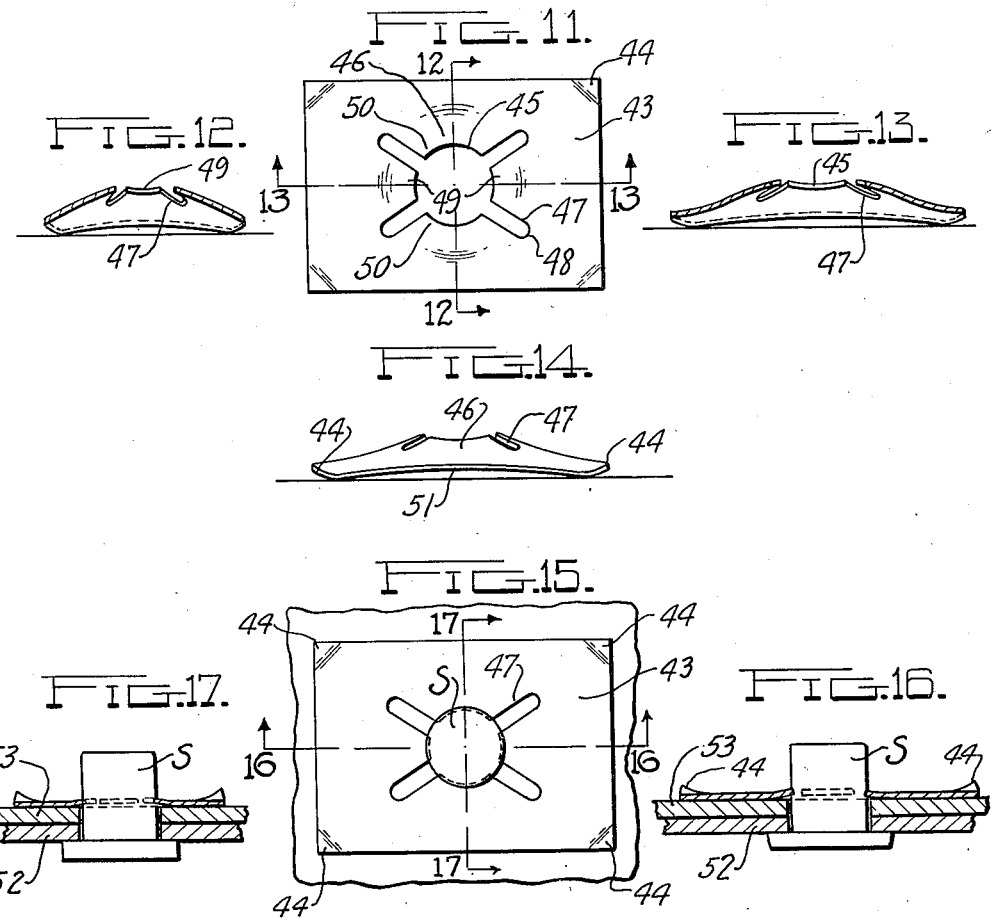

2,266,049

UNITED STATES PATENT OFFICE 2,266,049

FASTENER

Harold W. Kost, Birmingham, Mich., assignor to Detroit Harvester Company, Detroit, Mich., a corporation of Michigan Application March 30, 1939, Serial No. 264,958

8 Claims. (Cl. 85—36)

This invention relates to fastening devices and is particularly directed to spring fasteners of a character capable of self-locking engagement with a pin, stud, or screw.

An object of the invention is to provide a spring fastener with both longitudinal and lateral camber for imparting positive gripping or biting engagement with the member upon which it is mounted.

Another object is to produce a fastener having an annular series of tongues which are so constructed and arranged that when in fastening position, all of the tongues exert an exceedingly tight biting engagement with the member, such as a stud or screw, to which it is applied, thereby securely and positively retaining the parts in the desired relation.

A further object is to produce a fastener of the above character in which slitting of the metal that weakens the structure is obviated.

A still further object is to produce a spring fastener which is so constructed and arranged that application to the stud or other member is facilitated but after being finally forced into place a more effective gripping action is obtained.

Further objects and advantages will become apparent from a study of the following description when taken in connection with the accompanying drawings, in which:

Figure 1 is a top plan view of a fastener incorporating the present invention;

Figure 2 is sectional detail view taken substantially on a line 2—2 of Figure 1;

Figure 3 is a sectional detail view taken substantially on a line 3—3 of Figure 1;

Figure 4 is a plan view of the fastener of Figure 1 assembled with a stud;

Figure 5 is a sectional detail view taken substantially on a line 5—5 of Figure 4;

Figure 6 is a top plan view of another form of fastener;

Figure 7 is sectional detail view taken substantially on a line 7—7 of Figure 6;

Figure 8 is a plan view of the fastener of Figure 6 assembled with a stud;

Figure 9 is a side elevation of the assembly illustrated in Figure 8;

Figure 10 is a sectional detail view taken substantially in a line 10—10 of Figure 8;

Figure 11 is a top plan view of another form of fastener;

Figure 12 is a transverse sectional view on the line 12—12 of Figure 11;

Figure 13 is a sectional view on the line 13—13 of Figure 11;

Figure 14 is a side edge elevation of the fastener shown in Figure 11;

Figure 15 is a top plan view of the fastener applied to a stud;

Figure 16 is a sectional view on the line 16—16 of Figure 15;

Figure 17 is a sectional view on the line 17—17 of Figure 15.

Referring to the form of the invention illustrated in Figures 1 to 5, the fastener 10 is a one piece substantially rectangular element formed of spring steel or other material having the characteristics of spring steel, and is of comparatively thin gauge stock. The fastener 10 is preferably arched transversely of one of its dimensions as shown in Figure 2 to form a longitudinal camber between end portions 12 and 14, interconnected by bridge portions 15, and provided with an aperture indicated generally at 16, and a substantially cone-shaped protuberance 17.

The aperture 16 is desirably of the shape illustrated, formed by punching a generally cross-shaped slug from the material to provide a central opening defined by the ends of a plurality of tongues 18, 19, 20 and 21, which are separated by radial notches or slots 22. Thus the tongues are spaced to engage diametrically opposite portions of a pin or stud 24 illustrated in Figures 4 and 5, with which the fastener is to be used, one pair of tongues projecting from the opposite ends 12 and 14 and another pair propecting from the bridge portions 15. The base of the protuberance 17 preferably forms a circle passing through the outer ends of the slots 22. The distance between the stud engaging ends of the opposed tongues 18 and 20, and 19 and 21 is slightly less than the diameter of the stud. The tongues are displaced or deformed slightly outwardly from the body of the fastener and are arched transversely. Due to the resiliency of the metal, the tongues bite into or firmly grip the stud 24 at four spaced points. Such gripping force or biting action is further enhanced by the initial arched form of the fastener.

As particularly shown in Figure 5, the tongues bind firmly against the surface of the stud 24 and prevent relative displacement between these parts in the opposite direction. As shown, the edges of the tongues are generally arcuate, so that they engage the stud substantially with point contact to further enhance their biting action. When assembled on the stud, as shown particularly in Figure 5, the initial arch or camber is flattened substantially into engagement with the adjacent panel or other structure 25. It is to be understood that the stud 24 is carried by a panel 24ª which is to be connected to the panel 25.

In the form of the invention shown in Figures 6 to 10, the fastener indicated generally at 28 is more particularly arranged for assembly with a stud or pin 30 of generally rectangular cross section. The fastener 28 is formed of comparatively thin spring steel having upturned ends 32 connected by an intermediate bridge or arch portion 33. A central somewhat diamond shaped protuberance 35 is formed in the element 28. The apex of the protuberance is provided with an aperture 36 and is slit longitudinally at 37 to form oppositely disposed pairs of teeth or tongues 38 and 39. The ends of the tongues provide portions of the sides of the opening 36, the end walls of which are laterally disposed and then converge angularly to define the tongues and form generally V-shaped ends 40 in the aperture.

By means of the protuberance 35 the walls of which are arched both longitudinally and laterally, the tongues 38 and 39 are displaced outwardly from the body of the fastener 28 and due to the resiliency of the metal, they bite into or grip the stud at four spaced points as in the previously described form of the invention. As particularly shown in Figure 10, the tongues engage the surface of the stud at an angle due to the formation of the protuberance, and as the opening 36 is preferably slightly narrower than the width of the stud a positive grip therebetween is secured when the nut is applied to the stud.

In Figure 9, it will be noted that upon assembly with the stud 30, the initial arch of the fastener is somewhat flattened when the fastener body is drawn into final engagement with a panel or other structure 42 with which the assembly is used. As shown the stud 30 is carried by a panel 30ª which is to be connected to the panel 42. The upturned end portions 32 serve to prevent the ends from digging into the panel, as will be readily understood.

In the form of the invention shown on Figures 11 to 17, the fastener comprises a relatively thin spring metal body 43 which in this instance is in the form of a relatively small rectangular piece. The metal at each corner of the body 43 is formed with an up-turned portion 44 which is adapted to bear against the surface against which the fastener abuts and enables the sides of the fastener to ride along such surface, so that the upturned portions militate against the corners of the fastener digging or biting into the panel or abutting surface and interfering with the desired action of the fastener. Formed in the central portion of the body 43 is a hole 45 of substantially the diameter of the stud S, to which the fastener is applied. Preferably the hole or opening 45 should be slightly smaller than the circumference of the stud S, in order to have a snug fit between these parts.

The metal in the region of the hole 45 curves upwardly from the plane of the metal, providing a substantially dome-like annular protuberance 46. Radiating from the hole 45 and terminating at substantially the lower end of the protuberance 46 are notches 47, the inner ends 48 of which are rounded. It will be noted that four notches 47 are formed radiating from the hole 45 and each extends towards one of the four corners of the body 43. The provision of notches of this character in place of slits commonly used in this connection, is of importance in militating against tearing of the metal in the use of the fastener, and also eliminating friction which develops between adjacent parts in the case of the slit. It will be understood that the grain of the metal extends longitudinally of the body 43 and the notches 47 extend in that general direction.

It will be apparent that the notches 47 form pairs of tongues 49 and 50, the tongues 50 being somewhat wider than the tongues 49. The tongues 49, which extend somewhat longitudinally of the body 43 curve upwardly and inwardly toward each other from the body. Likewise, the tongues 50, which extend in approximate lateral directions, curve upwardly and inwardly toward each other in view of the formation of the protuberance 46. Thus it will be apparent that four tongues are provided which are adapted to engage the stud S. From an inspection of Figure 14, it will also be noted that the body 43 is formed with a camber 51 intermediate the ends. When the fastener is applied to the stud S, which may be carried by a panel 52, the latter being in abutting engagement with a panel 53, it is forced upon the shank of the stud S until it engages the under side of the panel 53. Thereupon a suitable tool is employed for flattening the body 43 against the under side of panel 53. This action causes the pairs of tongues 49 and 50 to grip the stud S exceedingly tight; in fact the tongues bite into the surface of the stud. Inasmuch as the tongues are formed on a curved or inclined protuberance of annular shape, all four tongues will be caused to impinge themselves firmly and securely against the stud. As a consequence, the stud is engaged uniformly substantially throughout its circumference so that a much more effective gripping action is obtained.

It will therefore be apparent that the curvature of the tongues both longitudinally and laterally of the body 43 of the fastener is of cardinal importance in producing a fastener which grips with substantially equal force throughout the circumference of the stud. It will be further understood that when the final tightening operation of the fastener or when the fastener is flattened against the panel, the fastener body rides along the panel because of the up-turned end portions 44 which, as above explained, militate against the fastener digging into the panel 53.

It is to be understood that numerous changes in details of construction, arrangement, and choice of materials may be effected without departing from the spirit of the invention, especially as defined in the appended claims.

What I claim is:

1. A fastener adapted for engagement with a stud comprising a strip of thin spring metal having ends, bridge portions between said ends, transversely arched tongues extending from said ends and said bridge portions and adapted to be disposed at an angle to said ends upon engagement with the stud, said transversely arched tongues having the chords of their arcs parallel to the plane of said ends, said tongues having arcuate end portions adapted for substantially point contact with the stud.

2. A fastener adapted for engagement with a stud comprising a strip of thin spring metal having end portions, bridge portions between said end portions, a pair of tongues extending from each of said end portions, the ends of said tongues being defined by a longitudinal slit and a transverse opening having notched end portions, and said tongues being disposed out of the plane of the metal and transversely arched to lie in the same spherical surface, and adapted to be disposed at an angle upon engagement with the stud.

3. A fastener comprising a comparatively thin sheet metal element of initially arched form, a generally cone-shaped protuberance in said element, and a cross-shaped aperture substantially within the protuberance providing pairs of oppositely disposed transversely arched tongues with the chords of their arcs in parallel planes to the base of said fastener, the tongue ends being displaced outwardly from the plane of said element and having arcuate points.

4. A fastener comprising a body of spring metal having a substantially dome-like annular protuberance provided with a central aperture, notches radiating from said aperture terminating adjacent the outer edge portion of the protuberance providing an annular series of tongues extending longitudinally and laterally of said body respectively, said tongues having arcuately pointed ends, and being transversely arched with the chords of their arcs lying parallel with the base of the body, and said body being cambered longitudinally thereof.

5. A fastener comprising a body of spring metal having a substantially dome-like annular protuberance provided with a central aperture, notches radiating from said aperture terminating adjacent the outer edge portion of the protuberance providing an annular series of tongues extending longitudinally and laterally of said body respectively, said tongues being transversely arched with the chords of their arcs lying parallel with the base of the body, and said body being cambered longitudinally thereof, and means at the corner portions of the body to enable same to slide freely along a substantially flat surface.

6. A fastener comprising a body of spring metal having a substantially dome-like annular protuberance provided with a central aperture, notches radiating from said aperture terminating adjacent the outer edge portion of the protuberance providing an annular series of tongues extending longitudinally and laterally of said body respectively, said tongues being transversely arched with the chords of their arcs lying parallel with the base of the body, and said body being cambered longitudinally thereof, and rectangular in shape and upturned corner edges in said body.

7. A fastener comprising a body of spring metal having a substantially dome-like annular protuberance provided with a central aperture, notches radiating from said aperture terminating adjacent the outer edge portion of the protuberance providing an annular series of tongues extending longitudinally and laterally of said body respectively, said tongues being transversely cambered with the chords of their camber parallel to the base of the body, the inner ends of said notches being rounded and the notches extending in the general direction of the grain of the metal, and said body being cambered longitudinally thereof, and rectangular in shape and upturned corner edges on said body.

8. A fastener comprising a sheet metal body having an aperture for the reception of a member to which the fastener is to be applied, the metal in the region of the aperture being raised and extending angularly therefrom to the body, notches radiating from said aperture providing two pairs of independent tongues, one pair extending longitudinally of the body, the tongues of each pair being on opposite sides of the aperture, the metal of each pair of tongues extending at an inclined angle downwardly toward the body, the body being cambered longitudinally, and the tongues being cambered laterally, said cambered tongues lying in the same curvilinear surface whereby upon flattening the body the tongues are forced inwardly to constrict the aperture substantially uniformly throughout.

HAROLD W. KOST.